US 7,983,164 B2

(12) United States Patent
Kim et al.

(10) Patent No.: US 7,983,164 B2
(45) Date of Patent: Jul. 19, 2011

(54) APPARATUS AND METHOD FOR MERGING INTERNET TRAFFIC MIRRORED FROM MULTIPLE LINKS

(75) Inventors: Sang Wan Kim, Daejeon (KR); Sang Sik Yoon, Gwangju (KR); Tae Sang Choi, Daejeon (KR); Dong Won Kang, Daejeon (KR); Joon Kyung Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 96 days.

(21) Appl. No.: 11/932,886

(22) Filed: Oct. 31, 2007

(65) Prior Publication Data

US 2008/0130497 A1   Jun. 5, 2008

(30) Foreign Application Priority Data

Dec. 1, 2006   (KR) .................. 10-2006-0120784
Jul. 27, 2007   (KR) .................. 10-2007-0075546

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/56 | (2006.01) |
| H04J 3/24 | (2006.01) |
| G06F 15/16 | (2006.01) |
| G06F 15/173 | (2006.01) |

(52) U.S. Cl. ........ 370/235; 370/394; 370/474; 709/236; 709/240

(58) Field of Classification Search .................. 370/235, 370/389, 390, 392, 393, 394, 395.4, 395.42, 370/395.43, 395.5, 428, 429, 474, 475, 476; 709/236, 238, 240, 245

See application file for complete search history.

(56) References Cited

U.S. PATENT DOCUMENTS

| | | | | |
|---|---|---|---|---|
| 6,298,038 | B1* | 10/2001 | Martin et al. ............... | 370/216 |
| 6,831,893 | B1* | 12/2004 | Ben Nun et al. ............. | 370/235 |
| 7,254,114 | B1* | 8/2007 | Turner et al. ................. | 370/244 |
| 7,298,762 | B2* | 11/2007 | Rakib ........................... | 370/468 |
| 7,310,306 | B1* | 12/2007 | Cheriton ....................... | 370/218 |
| 7,366,174 | B2* | 4/2008 | MacFaden et al. ........... | 370/392 |
| 7,574,522 | B2* | 8/2009 | Oguchi ......................... | 709/238 |
| 2002/0181475 | A1* | 12/2002 | Dove et al. .................... | 370/398 |
| 2003/0081547 | A1* | 5/2003 | Ho ................................. | 370/229 |
| 2003/0189932 | A1* | 10/2003 | Ishikawa et al. ............. | 370/392 |
| 2003/0212999 | A1* | 11/2003 | Cai ............................... | 725/119 |
| 2005/0120140 | A1* | 6/2005 | Bodlaender ................... | 709/249 |
| 2005/0249125 | A1 | 11/2005 | Yoon et al. | |
| 2006/0045052 | A1* | 3/2006 | Yoo .............................. | 370/335 |

(Continued)

FOREIGN PATENT DOCUMENTS

KR   1020030028013 A   4/2003

(Continued)

*Primary Examiner* — Xavier Szewai Wong

(57) ABSTRACT

An apparatus and method for merging Internet traffic mirrored from multiple links are provided. A merged flow can be generated on the Internet having a characteristic of asymmetrical route through a technology of merging the traffic according to an identical characteristic based on correlation analysis using internet traffic mirrored from several spots of multiple links connected to a network to facilitate general analysis and specific application analysis of traffic.

9 Claims, 4 Drawing Sheets

U.S. PATENT DOCUMENTS

| | | | |
|---|---|---|---|
| 2006/0133274 A1* | 6/2006 | Lee et al. | 370/230 |
| 2007/0195787 A1* | 8/2007 | Alnuweiri et al. | 370/395.4 |
| 2007/0198741 A1* | 8/2007 | Duffy et al. | 709/245 |
| 2009/0175297 A1* | 7/2009 | Prakash | 370/476 |

FOREIGN PATENT DOCUMENTS

| | | |
|---|---|---|
| KR | 1020040052015 A | 6/2004 |
| KR | 1020040091846 A | 11/2004 |
| KR | 1020060024092 A | 3/2006 |

* cited by examiner

APPARATUS AND METHOD FOR MERGING INTERNET TRAFFIC MIRRORED FROM MULTIPLE LINKS

CROSS-REFERENCE TO RELATED APPLICATIONS

This application claims the priority of Korean Patent Application No. 10-2007-0075546, filed on Jul. 27, 2007 and Korean Patent Application No. 10-2006-0120784, filed on Dec. 1, 2006 in the Korean Intellectual Property Office, the disclosure of which is incorporated herein by reference.

BACKGROUND OF THE INVENTION

1. Field of the Invention

The present invention relates to a technology for merging internet traffic, and more particularly, to an apparatus and method for merging traffic of an identical characteristic by analyzing traffic information mirrored from several spots of multiple links through correlation analysis to easily perform general analysis and specific application analysis of traffic.

This work was supported by the IT R&D program of MIC/IITA[2006-S-065-02, "Development of High-Speed Wireline (10 Gbps, 2.5 Gbps) for Charging"].

2. Description of the Related Art

In general, internet traffic signifies data transmitted through the Internet. Conventionally, internet traffic analysis is to summarize and present information on packets forming traffic transmitted through a certain physical link. However, as the use of the Internet is popularized and a matter of detecting the one to be charged for the use of the Internet service becomes significant, there is a great demand for a system for analyzing internet traffic communicated between countries or between internet service providers and presenting the analysis result.

Traffic routes on the Internet are asymmetrical and this is the characteristic of the Internet. For this reason, when a network is connected to several external links, traffic should be merged in the form of integrated application flow through correlation analysis in which traffic mirrored from multiple spots is taken into consideration simultaneously. However, researchers have not provided a standardized method for such traffic mergence.

SUMMARY OF THE INVENTION

An aspect of the present invention provides an apparatus for merging traffic of an identical characteristic by analyzing internet traffic information mirrored from several spots of multiple links connected to a network through correlation analysis.

According to an aspect of the present invention, there is provided an apparatus for merging internet traffic mirrored from multiple links, which comprises a traffic collector, a traffic classifier, and a traffic merger. The traffic collector collects traffic at several spots of multiple internet links, and the traffic classifier classifies the traffic according to an identical traffic characteristic by analyzing the collected traffic. The traffic merger generates merged traffic by merging traffic of each classification type.

The traffic classifier may extract a key value and an R key value of traffic by analyzing the collected traffic, and classify the collected traffic into forward traffic and reverse traffic based on the extracted key and R key values.

The traffic merger may comprise a one-way traffic merging unit and a two-way traffic merging unit. The one-way traffic merging unit generates forward merged traffic by merging forward traffic classified in the traffic classifier, and generates reverse merged traffic by merging reverse traffic classified in the traffic classifier. The two-way traffic merging unit generates two-way merged traffic by merging the forward merged traffic with the reverse merged traffic, which are generated in the one-way traffic merging unit.

According to another aspect of the present invention, there is provided a method for merging internet traffic mirrored from multiple links. In the method, traffic is collected at several spots of multiple internet links, and characteristic of the collected traffic is extracted by analyzing the collected traffic. Then, the traffic is classified according to an identical traffic characteristic based on the extracted traffic characteristic, and merged traffic is generated by merging traffics of each classification type.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

In order to clearly describe the present invention, the descriptions of well-known functions and elements are omitted. Like numeral references denote like element throughout the accompanying drawings.

It will be understood that when an element is referred to as being "connected" to the other element, it can be directly connected to the other element or it can be electrically connected with an element interleaved therebetween. Also, it will be understood that when an element is referred to as "including" the other elements, it can further include other elements.

Throughout the specification, a module denotes a unit of a predetermined function or processing a predetermined operation. The module can be embodied as hardware, software, or combination thereof.

Figure 1:
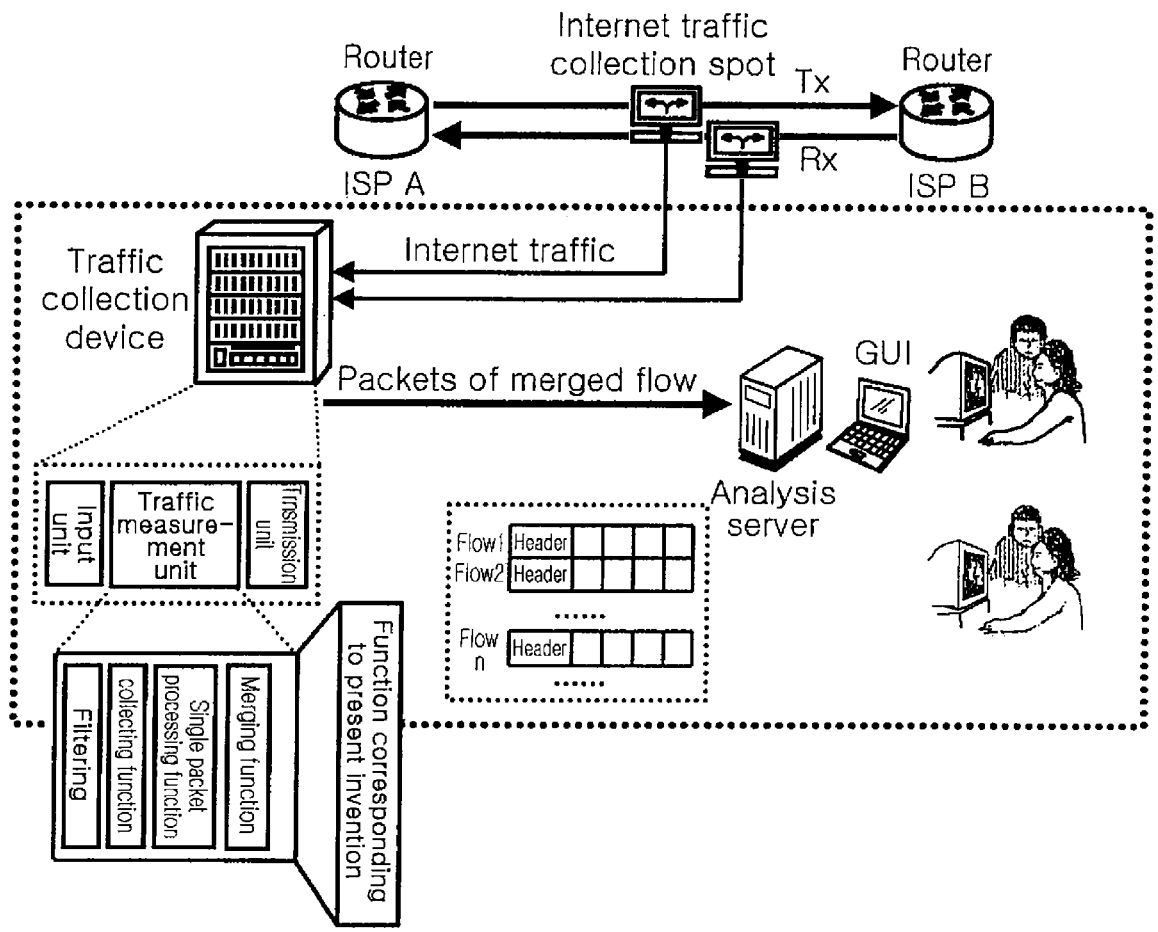
FIG. 1 is a conceptual view illustrating an apparatus for merging internet traffic mirrored from multiple links in accordance with an embodiment of the present invention.

FIG. 1 is a conceptual view illustrating an apparatus for merging internet traffic mirrored from multiple links in accordance with an embodiment of the present invention.

A typical traffic analysis system includes a traffic collection system for capturing or collecting internet traffic and an analysis server for analyzing contents of the collected traffic. The internet traffic merging apparatus proposed in the present invention is a functional element inside the traffic collection system. It merges traffic collected by the traffic collection system into single flow to help the analysis server execute analysis based on the data of the single flow with accuracy and reliability.

Figure 2:
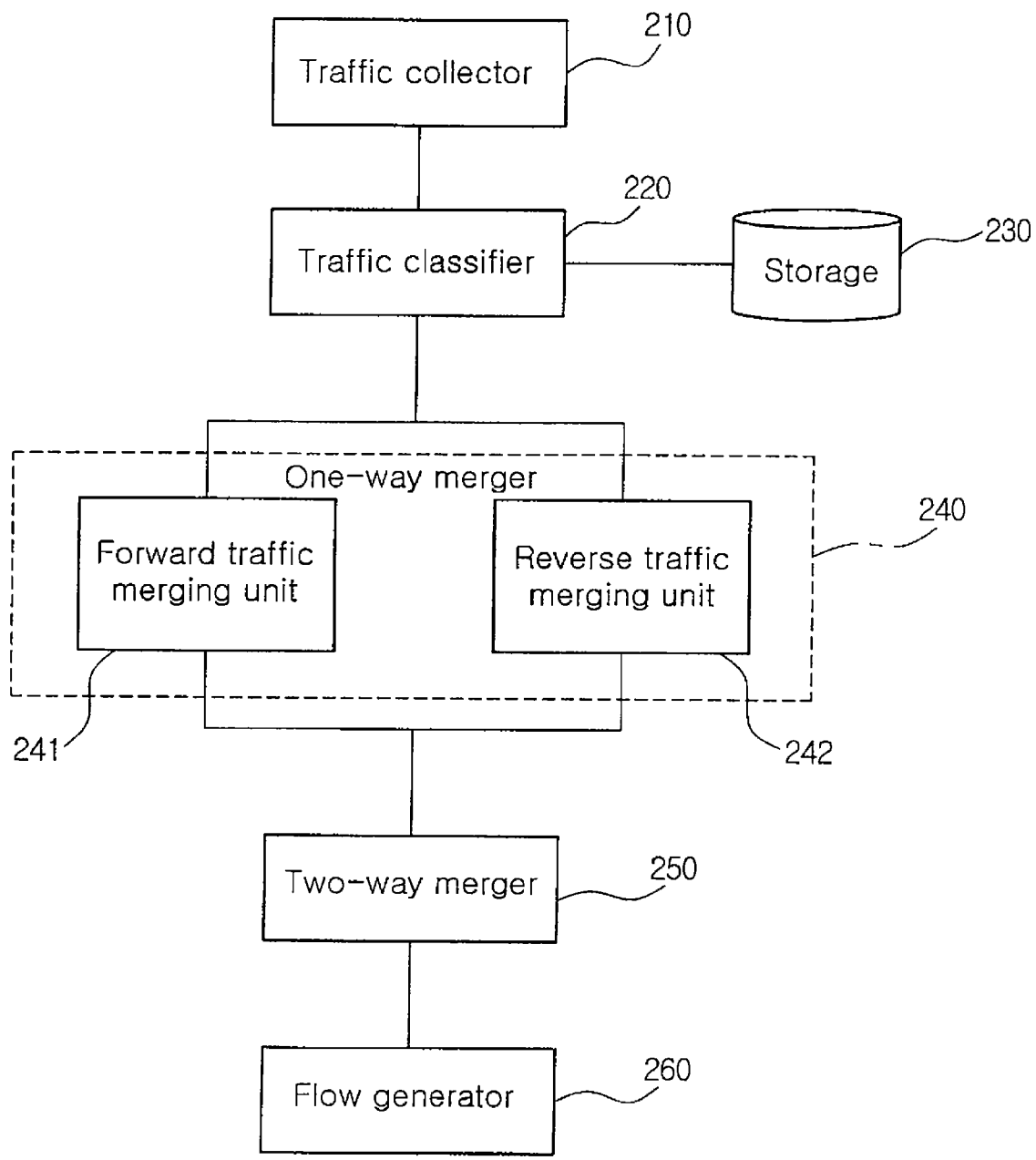
FIG. 2 is a block view showing a structure of the apparatus for merging internet traffic mirrored from multiple links in accordance with an embodiment of the present invention.

FIG. 2 is a block view showing a structure of the apparatus for merging internet traffic mirrored from multiple links in accordance with an embodiment of the present invention.

Referring to FIG. 2, the internet traffic merging apparatus includes a traffic collector 210 for collecting traffic from internet links, a traffic classifier 220 for analyzing the collected traffic and classifying the traffic into forward traffic and reverse traffic according to their characteristic, a storage for storing the classified traffic, a one-way merger 240 for merging the stored traffic in one way, a two-way merger 250 for merging the one-way traffic obtained from the one-way traffic mergence in two ways, and a flow generator 260 for generating merged flow from the merged traffic. Hereinafter, the constituent elements will be described in detail.

The traffic collector 210 collects traffic at several spots of internet links. Herein, "several spots" signify multiple links where a router is connected to another router or multiple links where a terminal is connected to a router. The internet traffic is measured by mirroring an actual route of internet traffic and copying the contents of the actual traffic.

The traffic classifier 220 classifies the internet traffic collected in the traffic collector 210 into forward traffic and reverse traffic. The traffic classification begins with extraction of a key value and a reverse (R) value of traffic by analyzing the internet traffic. The key value of traffic 5-tuple information of Internet Protocol (IP) header. The 5-tuple includes destination IP address, source IP, destination port number, source port number, and protocol ID. The R key value is a key value that makes destination IP address/destination port number of the key value correspond to source IP address/source port number, and makes source IP address/source port number of the key value correspond to destination IP address/destination port number. In short, the R key value of traffic is a key value obtained by switching the source information with destination information among the key values extracted from the IP header. For example, when 4-tuple information (which includes source IP address, destination IP address, source port number, and destination port number) of a key value is 129.254.1.1/162.266.2.2/9200/8080, the R key value is 162.266.2.2/129.254.1.1/8080/9200.

Forward traffic is formed of traffic having an identical key value when key values are extracted from the collected traffic, and reverse traffic is formed of traffic having an R key value the same as forward traffic when R key values are extracted from the collected traffic. Besides, there are traffic that can be classified into forward traffic and reverse traffic, which will be described later with reference to FIG. 3.

When the forward traffic and reverse traffic are separated from each other, they are stored in the storage 230 according to their type.

Herein, when traffic having an identical key value are classified and stored according to the traffic type, which is a forward traffic type or reverse traffic type, it is determined whether predetermined timeout time is over. This is to maximally collect traffic having the same key value by maintaining a forward traffic list and a reverse traffic list for a predetermined time. Herein, a time control unit for controlling whether the timeout time is over in the traffic classifier 220 and the storage 230 may be provided separately, or it may be embodied to be integrated with another element.

Traffic classified according to the traffic type in the traffic classifier 220 is merged into forward merged traffic or reverse merged traffic in the one-way merger 240. The forward merged traffic is generated in a forward traffic merging unit 241 and the reverse merged traffic is generated in a reverse traffic merging unit 242.

The forward traffic merging unit 241 generates one-way merged traffic by collecting forward traffic having an identical key value, and the reverse traffic merging unit 242 generates reverse merged traffic by collecting reverse traffic having an identical key value. When there is forward traffic while there is no reverse traffic, the reverse traffic merging unit 242 does not operate but only the forward traffic merging unit 241 generates forward merged traffic. Since the reverse traffic merging unit 242 does not operate, the two-way merger 250 does not operate, either.

When the one-way merger 240 generates forward merged traffic and reverse merged traffic, the two-way merger 250 merges the one-way merged traffic to thereby generate two-way merged traffic.

The flow generator 260 generates merged flow, using the merged traffic generated in the one-way merger 240 and the two-way merger 250.

To be specific, when the one-way merger 240 generates forward merged traffic and does not generate reverse merged traffic, it produces one-way merged traffic based on the forward merged traffic and the reverse traffic merging unit 242 operates to produce reverse merged traffic. Since two-way traffics are generated, the flow generator 260 can generate two-way merged flow. The merged flow has a new traffic format in which all common contents of the merged traffics are included as header information and the contents of the respective traffic are included as payload.

The merged flow basically has a format of a merged flow header and payload. The format of the header and the payload may be modified according to the utility purpose of an analysis server. Generally, the header of merged flow has values (such as a field for indicating one-way mergence or two-way mergence, the number of merged packets, and the size of payload) indicating characteristics of packets included in the merged flow payload as field values. The merged flow payload has values (such as 5-tuple information, flow starting time, flow end time, the amount of packet bytes, and payload of packets) indicating useful information through analysis in the analysis server as field values.

Figure 3:
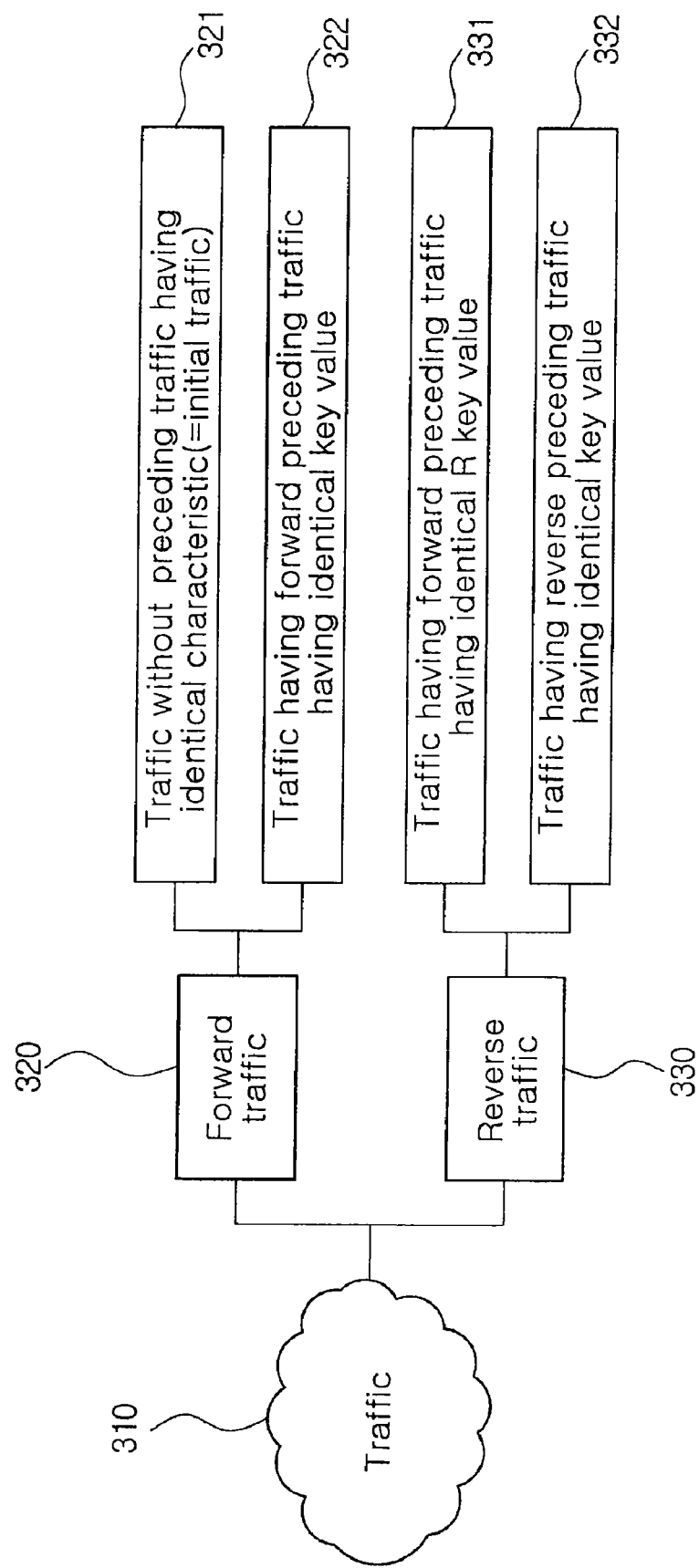
FIG. 3 shows types of traffic classified to be merged in accordance with an embodiment of the present invention.

FIG. 3 shows types of traffic classified to be merged in accordance with an embodiment of the present invention.

Referring to FIG. 3, traffic is divided into two types: a forward traffic type 320 and a reverse traffic type 330. Collected traffic is classified according to the traffic types.

Traffic classified as the forward traffic type 320 can be divided into to cases. One is traffic having no preceding traffic having an identical key value on the forward and reverse traffic lists and no preceding traffic having an identical R key value on the forward traffic list. In short, traffic of the case is initially collected traffic 321 having no preceding traffic of an identical characteristic (i.e., identical key or R key value). The other is traffic 322 having forward preceding traffic of an identical key value on the forward traffic list.

Traffic classified as the reverse traffic type 330 can be also divided into to cases. One is traffic 331 having preceding traffic of an identical R key value on the forward traffic list, and the other is traffic 332 having reverse preceding traffic having an identical key value on the reverse traffic list.

Figure 4:
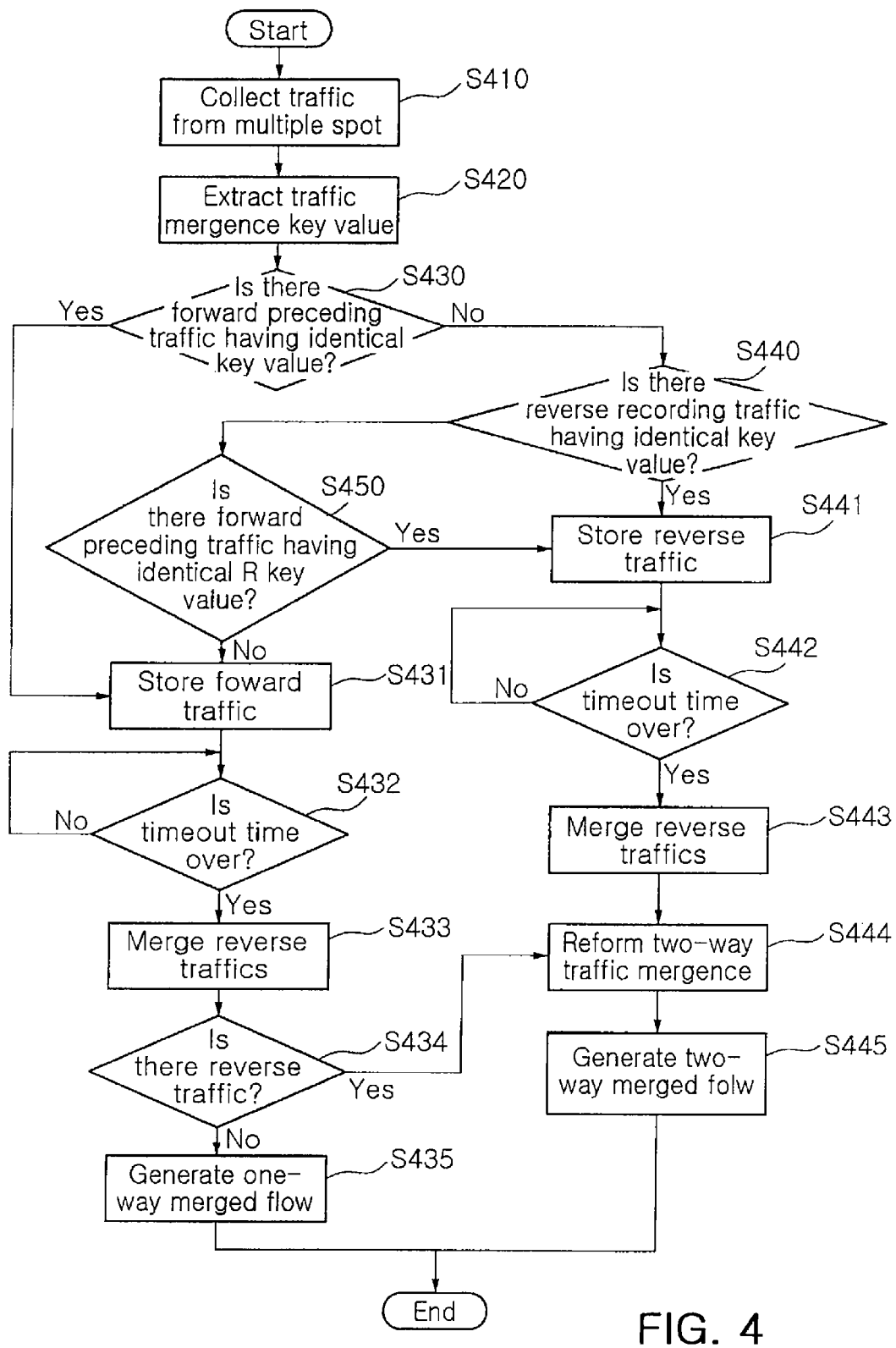
FIG. 4 is a flowchart describing a method for merging internet traffic mirrored from multiple links in accordance with an embodiment of the present invention.

FIG. 4 is a flowchart describing a method for merging internet traffic mirrored from multiple links in accordance with an embodiment of the present invention.

Referring to FIG. 4, in operation S410, traffic mergence begins with collecting traffic from multiple spots in a network.

When traffic is collected, a key value is extracted from the collected traffic in operation S420, and the collected traffic is classified based on the extracted key value. The traffic is classified according to the classification method described above with reference to FIGS. 2 and 3. In short, the traffic is classified into the forward traffic type 320 and the reverse traffic type 330.

To be specific, it is determined in operation S430 whether there is preceding traffic having the key value extracted from the collected traffic. When there is preceding traffic having the same key value as the extracted key value, the collected traffic is classified as forward traffic and stored in operation S431.

When there is no preceding traffic having the same key value, it is determined in operation S440 whether there is reverse traffic having the same key value. When there is reverse preceding traffic having the same key value, the collected traffic is classified as reverse traffic and stored in operation S441.

However, when there is no reverse preceding traffic having the identical key value, it is determined in operation S450 whether there is forward preceding traffic having the identical R key value. When there is no such traffic, the collected traffic is classified as forward traffic and stored in operation S431.

When there is no forward preceding traffic having the identical R key value, the collected traffic is classified as reverse traffic and stored in the operation S441.

When the collected traffic is classified into forward traffic of an identical key value and reverse traffic of an identical key value according to the traffic type and stored through the process described above, it is determined in operations 432 and 442 whether predetermined timeout time is over or not. This is to maximally collect traffic having an identical key value by maintaining forward and reverse traffic lists for the predetermined time. When the timeout time is over, traffics collected on the forward traffic list and the reverse traffic list based on the identical key value are merged to thereby produce one-way traffics through forward traffic mergence and reverse traffic mergence process in operations S433 and S443. Herein, the timeout time may be determined depending on each case.

When one-way merged traffic is generated in the operations S433 and S443, it is determined in operation S434 whether there is reverse merged traffic.

When there is no reverse merged traffic, a one-way merged flow generator generates one-way merged flow in operation S435. When there is reverse merged traffic, the forward merged traffic is merged with the reverse merged traffic in operation S444.

Subsequently, a two-way merged flow generator generates two-way merged flow in operation S445. The one-way merged flow and the two-way merged flow have a new traffic format where common contents of all merged traffics are included in header information and individual contents of the traffics are included in payload.

As described above, the apparatus and method for merging internet traffic mirrored from multiple links processes traffic mirrored from several spots of the multiple links connected to the Internet and generates merged flow based on identical key value information to easily perform general analysis and specific application analysis of traffic on the Internet having a characteristic of asymmetrical route.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for merging internet traffic mirrored from multiple links and providing the merged internet traffic to an analysis server of a traffic analysis system, the apparatus comprising:
   a traffic collector for collecting traffic at several spots of multiple internet links;
   a traffic classifier for classifying the traffic according to an identical traffic characteristic by analyzing the collected traffic;
   a traffic merger for generating merged traffic by merging traffic of each classification type; and
   a flow generator for generating a single merged flow from the generated merged traffic and providing the single merged flow to the analysis server,
   wherein the traffic merger comprises:
      a one-way traffic merging unit for generating forward merged traffic by merging forward traffic classified in the traffic classifier, and generating reverse merged traffic by merging reverse traffic classified in the traffic classifier; and
      a two-way traffic merging unit for generating two-way merged traffic by merging the forward merged traffic with the reverse merged traffic, which are generated in the one-way traffic merging unit.

2. The apparatus of claim 1, wherein the two-way traffic merging unit operates on a condition that the reverse merged traffic is generated.

3. An apparatus for merging internet traffic mirrored from multiple links and providing the merged internet traffic to an analysis server of a traffic analysis system, the apparatus comprising:
   a traffic collector for collecting traffic at several spots of multiple internet links;
   a traffic classifier for classifying the traffic according to an identical traffic characteristic by analyzing the collected traffic; and
   a traffic merger for generating merged traffic by merging traffic of each classification type; and
   a flow generator for generating a single merged flow from the generated merged traffic and providing the single merged flow to the analysis server,
   wherein the traffic merger comprises:
      a one-way traffic merging unit for generating forward merged traffic by merging forward traffic classified in the traffic classifier, and generating reverse merged traffic by merging reverse traffic classified in the traffic classifier; and
      a two-way traffic merging unit for generating two-way merged traffic by merging the forward merged traffic with the reverse merged traffic, which are generated in the one-way traffic merging unit,
   wherein the flow generator generates two-way merged flow from the generated two-way merged traffic.

4. The apparatus of claim 1, wherein the flow generator generates forward merged flow from the generated forward merged traffic when the reverse merged traffic is not generated.

5. The apparatus of claim 1, wherein the generated merged flow has a traffic format where common contents of all the merged traffics are included in header information, and individual contents of the traffics are included in payload.

6. The apparatus of claim 4, wherein the generated merged flow has a traffic format where common contents of all the merged traffics are included in header information, and individual contents of the traffics are included in payload.

7. A method for merging internet traffic mirrored from multiple links and providing the merged internet traffic to an analysis server of a traffic analysis system, the method comprising:

collecting traffic at several spots of multiple internet links;

extracting a characteristic of the collected traffic by analyzing the collected traffic;

classifying the traffic according to an identical traffic characteristic based on the extracted traffic characteristic;

generating merged traffic by merging traffics of each classification type;

generating a single merged flow in a traffic format where common contents of all the traffics of the generated merged traffic are included in header information, and individual contents of the traffics are included in payload; and providing the single merged flow to the analysis server, wherein the classifying of the traffic according to an identical traffic characteristic based on the extracted traffic characteristic comprises:

classifying the collected traffic as forward traffic; and classifying the collected traffic as reverse traffic, and wherein the generating of merged traffic by merging traffics of each classification type comprises:

generating forward merged traffic by merging the classified and stored forward traffic; and generating reverse merged traffic by merging the classified and stored reverse traffic, wherein the generating of merged traffic by merging traffics of each classification type further comprises generating two-way merged traffic by merging the forward merged traffic with the reverse merged traffic, when the forward merged traffic and the reverse merged traffic are generated.

8. The method of claim 7, wherein one-way merged flow is generated in a traffic format where common contents of all the traffics of the generated forward merged traffic are included in header information, and individual contents of the traffics are included in payload, when only the forward merged traffic is generated.

9. The method of claim 7, wherein two-way merged flow is generated in a traffic format where common contents of all the traffics of the generated two-way merged traffic are included in header information, and individual contents of the traffics are included in payload.

\* \* \* \* \*